(12) United States Patent
Lat

(10) Patent No.: US 7,845,888 B2
(45) Date of Patent: Dec. 7, 2010

(54) SCALLOPED TAPE COLLATING STRIP FOR NAILS

(75) Inventor: Geronimo E. Lat, Ivanhoe, IL (US)

(73) Assignee: Illinois Tool Works Inc., Glenview, IL (US)

( * ) Notice: Subject to any disclaimer, the term of this patent is extended or adjusted under 35 U.S.C. 154(b) by 298 days.

(21) Appl. No.: 11/279,292

(22) Filed: Apr. 11, 2006

(65) Prior Publication Data

US 2007/0237607 A1    Oct. 11, 2007

(51) Int. Cl.
F16B 15/08 (2006.01)
(52) U.S. Cl. .................................. 411/442; 411/443
(58) Field of Classification Search .............. 411/424, 411/442, 443; 206/343–345, 346, 347; 428/192, 428/343; 227/120, 136
See application file for complete search history.

(56) References Cited

U.S. PATENT DOCUMENTS

| | | | | |
|---|---|---|---|---|
| 2,200,240 A | * | 5/1940 | Gilpin | 105/409 |
| 2,555,564 A | * | 6/1951 | Berman | 428/181 |
| 2,584,074 A | * | 1/1952 | Wilkins | 428/43 |
| 2,728,514 A | * | 12/1955 | Holtkamp | 411/466 |
| 2,734,117 A | * | 2/1956 | Randall | 219/105 |
| 2,755,984 A | * | 7/1956 | Reifers | 206/521.4 |
| 2,991,477 A | | 7/1961 | Hoyle, Jr. et al. | |
| 3,031,670 A | * | 5/1962 | Sillars | 206/344 |
| 3,152,334 A | * | 10/1964 | Lingle | 206/344 |
| 3,212,632 A | | 10/1965 | Baum et al. | |
| 3,358,822 A | | 12/1967 | O'Connor | |
| 3,421,162 A | * | 1/1969 | Greenberg et al. | 4/513 |
| 3,471,008 A | | 10/1969 | Reich et al. | |
| 3,507,384 A | * | 4/1970 | Lippitt | 206/343 |
| 3,625,352 A | | 12/1971 | Perkins | |
| 3,736,198 A | | 5/1973 | Leistner | |
| 3,756,391 A | | 9/1973 | Keck et al. | |
| 3,802,987 A | * | 4/1974 | Noll | 156/296 |
| 3,828,924 A | | 8/1974 | Perkins | |
| 3,861,527 A | | 1/1975 | Perkins | |
| 3,862,685 A | | 1/1975 | Mosetich et al. | |
| 3,966,042 A | | 6/1976 | Shelton et al. | |
| 3,967,727 A | | 7/1976 | Jakesch | |
| 4,162,728 A | | 7/1979 | Uzumcu et al. | |

(Continued)

FOREIGN PATENT DOCUMENTS

GB    2058004    4/1981

OTHER PUBLICATIONS

International Search Report for PCT/US2007/006215.

*Primary Examiner*—Victor Batson
*Assistant Examiner*—Roberta Delisle
(74) *Attorney, Agent, or Firm*—Levenfeld Pearlstein, LLC

(57) ABSTRACT

A fastener assembly for use in a fastener driving tool is formed as a row of fasteners arranged substantially parallel to each other and a supporting strip. The strip has a supporting substrate and an adhesive composition thereon. The supporting substrate has an elongated dimension extending generally in the direction of the row of fasteners. The supporting substrate defines upper and lower edges, at least one of which has a scallop formation therein between the fasteners. The scallop formation defines a 3-dimensional profile to stiffen the fastener assembly. The adhesive composition bonds to the fasteners to maintain the fasteners in the substantially parallel arrangement in the row. A method for making the assembly is also disclosed.

14 Claims, 1 Drawing Sheet

U.S. PATENT DOCUMENTS

| | | | |
|---|---|---|---|
| 4,250,996 A | 2/1981 | Bartz | |
| 4,298,121 A | 11/1981 | Oide et al. | |
| 4,343,579 A * | 8/1982 | Shelton et al. | 411/442 |
| 4,383,608 A | 5/1983 | Potucek | |
| 4,679,975 A | 7/1987 | Leistner | |
| 4,804,088 A | 2/1989 | MacDonald | |
| 4,867,366 A | 9/1989 | Kleinholz | |
| 4,881,643 A | 11/1989 | Pfister | |
| 4,932,821 A | 6/1990 | Steffen et al. | |
| 4,971,503 A | 11/1990 | Barnell et al. | |
| 5,005,699 A | 4/1991 | Kawashima et al. | |
| 5,056,976 A * | 10/1991 | Sygnator et al. | 411/442 |
| 5,060,797 A * | 10/1991 | Sygnator | 206/345 |
| 5,443,345 A | 8/1995 | Gupta | |
| 5,733,085 A | 3/1998 | Shida et al. | |
| 5,836,732 A | 11/1998 | Gupta et al. | |
| 5,865,311 A | 2/1999 | Hentges et al. | |
| 5,909,993 A * | 6/1999 | Leistner | 411/442 |
| 5,918,738 A * | 7/1999 | Leistner | 206/344 |
| 5,931,622 A | 8/1999 | Gupta et al. | |
| 6,044,972 A | 4/2000 | Rohrmoser et al. | |
| 6,082,536 A | 7/2000 | Ito et al. | |
| 6,086,304 A | 7/2000 | Hujishima et al. | |
| 6,257,438 B1 * | 7/2001 | von Holdt, Jr. | 220/659 |
| 6,431,430 B1 * | 8/2002 | Jalbert et al. | 227/131 |
| 6,557,703 B1 * | 5/2003 | Leitner | 206/338 |
| 6,705,464 B1 | 3/2004 | Yang | |
| 6,708,821 B2 | 3/2004 | Tucker et al. | |
| 6,758,018 B2 | 7/2004 | Sutt, Jr. | |
| 6,779,959 B1 | 8/2004 | Yang | |
| 6,823,990 B2 | 11/2004 | Gaudron | |
| 6,880,723 B2 | 4/2005 | Osuga et al. | |
| 2001/0010864 A1 * | 8/2001 | Ashcraft | 428/463 |
| 2001/0051239 A1 * | 12/2001 | Yamada et al. | 428/35.7 |
| 2002/0036228 A1 * | 3/2002 | Reese et al. | 229/4.5 |
| 2003/0145544 A1 * | 8/2003 | Sutt, Jr. | 52/364 |
| 2004/0118720 A1 | 6/2004 | Powers et al. | |
| 2005/0031436 A1 | 2/2005 | Yoshisawa et al. | |

* cited by examiner

SCALLOPED TAPE COLLATING STRIP FOR NAILS

BACKGROUND OF THE INVENTION

The present invention pertains to collated fasteners. More particularly, the present invention pertains to a collated nail strip formed with a scalloped-edge tape, for use in a fastener driving tool.

Fast-acting fastener driving tools are in widespread use in the construction industry. For use in these tools, the nails are assembled in strips that are inserted into a magazine of the tool. The strips are flat and the nails or other fasteners are held parallel to one another. The nails are assembled in a staggered or stepped manner such that the major axis of the nail forms an angle to the longitudinal direction of the strip. In presently known collated nails, the angle is about 10 degrees to 40 degrees and preferably between 15 degrees and 25 degrees. An in-depth discussion of such fasteners is provided in U.S. Pat. No. 5,733,085, to Shida, which is incorporated herein by reference.

Presently known collated nails are assembled using tape strips or an extruded plastic material. The plastic (or polymer) in the plastic-formed strips is cooled and hardens to hold the nails in the strip form for use in the tool. The tape strips are formed from a kraft paper or other paperboard material having a plastic (polymer) adhesive on a surface thereof that is heated on contact with hot nails and, as it cools, adheres to the nails.

The tape strips have the advantage of minimizing the debris that is formed as the tool is actuated and the nails are driven into the material (typically wood) to be fastened. However, with the tape strip it has been observed that the strip can flex and tend to advance on each other. This is a condition known as corrugation and has been found to be one of the greatest causes of tool jamming and fastener failure, and increases as the nails are spaced farther apart.

One way in which the corrugation problem has been addressed was to use a thicker tape with a relatively large quantity of adhesive material on the tape (to secure to the nails). However, it was found that as the strip's resistance to corrugation increased, the force required to separate the nail from the strip and to shear the tape, e.g., resistance to shear, increased as well. As such, nails tended to remain affixed to the tape and jamming of the tool occurred.

Accordingly, there is a need for a paper tape collation system for strip-formed fasteners that reduces the tendency for the nail strip to corrugate in the tool magazine. Desirably, such a system reduces the tendency to corrugate without increasing the shear required to properly separate the nail from the strip in a predetermined manner as the tool is actuated. More desirably, such a system reduces the tendency to corrugate without substantially increasing the size of the tape or the amount of adhesive.

BRIEF SUMMARY OF THE INVENTION

A fastener assembly is for use in a fastener driving tool. The assembly includes a row of fasteners arranged substantially parallel to each other and a strip having a supporting substrate and an adhesive composition thereon. The assembly forms a collating nail strip.

The substrate has an elongated dimension extending generally in the direction of the row of fasteners. The adhesive composition bonds the supporting substrate to the fasteners and maintains them in the substantially parallel arrangement in the row. The supporting substrate defines upper and lower edges, at least one of which has a scallop formation therein between the fasteners. The scallop formation defines a 3 dimensional profile to stiffen the fastener assembly. The adhesive composition bonds to the fasteners to maintain the fasteners in the substantially parallel arrangement in the row.

In a present assembly, strips are present on both sides of the row of fasteners to define opposing strips and the upper and lower edges of both strips have the scallop formation therein. A central portion of the strip, between the upper and lower edges is planar, that is, not scalloped. The scallop formation can be formed inwardly about 20 mils from a plane of the strip.

A method for making the fastener assembly includes the steps of arranging a plurality of fasteners in a row parallel to one another, heating the plurality of fasteners to elevate the temperature of the fasteners, applying a strip having a substrate and an adhesive thereon to the heated fasteners along a side of the row, the strip having an upper edge and a lower edge, applying pressure to the strip to adhere the strip to the fasteners and forming a scallop formation in the strip at the upper or lower edge between the fasteners and cooling the strip to form the fastener assembly.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
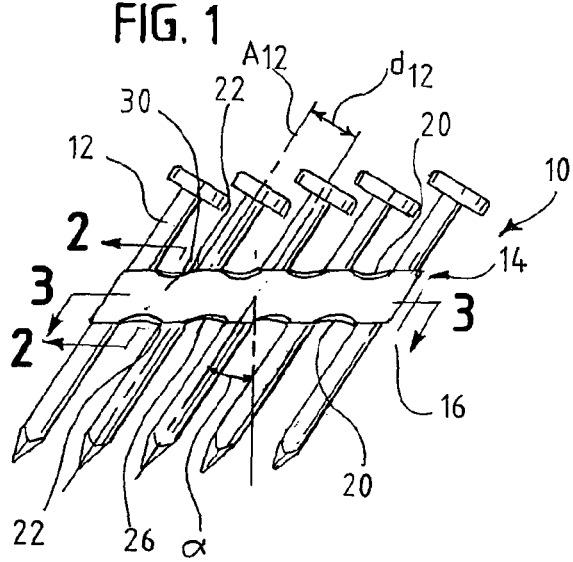
FIG. 1 is a plan view of one embodiment of a nail strip having a paper tape collation system having a scalloped upper and lower edges embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1 there is shown a nail strip 10 having a paper tape collation system with scalloped edges embodying the principles of the present invention.

As will be appreciated by those skilled in the art, the illustrated nails 12 are full head H nails, rather than D-head nails. Accordingly, the nails 12 provide increased holding characteristics (due to the increased surface area of the nail head H). However, it will also be appreciated that using full head H nails 12 requires that the strip 10 is fabricated with a slightly greater distance $d_{12}$ between the (axes $A_{12}$ of the) nails 12 to accommodate the larger nail heads H.

Figure 3:
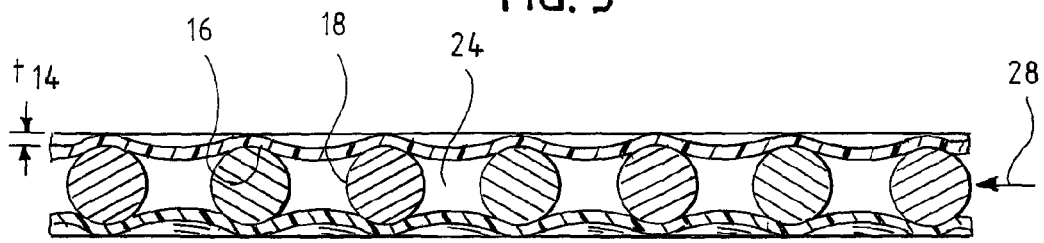
FIG. 3 is a cross-sectional view taken along line 3-3 of FIG. 1.

The nails 12 are collated and held to one another by tape strips 14. A strip 14 can be disposed along each side of the nail strip 10 as seen in FIG. 3. The tape strips 14 are adhered to the outer peripheral sides 16 of the nails 12 by an adhesive 18. Any of a variety of known adhesives can be used, such as extrudable polyolefins, such as maleic anhydride modified, and others, such as, but not limited to polyethylene (especially high density polyethylene), polypropylene, copolymers of ethylene with other alpha olefins (for example, linear low density polyethylene) copolymers of propylene with other alpha-olefins, copolymers of ethylene with ethylenically unsaturated esters and their derivatives (for example, ethylene vinyl acetate), and mixtures including any of these polymers. The adhesive can be applied by extrusion, coextrusion, spraying or a variety of other known application processes. It will be appreciated by those skilled in the art that a lamination formed from multiple layers of similar or dissimilar materials can be used to form the tape to achieve a desired result.

The strips 14 have scalloped upper and lower edges as indicated at 20. The scalloped edges 20 are formed by pressing the tape 14 material, at the edges 22, into the space 24 between the nails 12, or pressing the strips 14 on either side of the nails 12 in toward one another.

Figure 2:
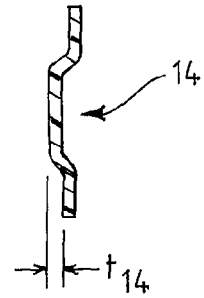
FIG. 2 is a cross-sectional view taken along line 2-2 of FIG. 1.

Advantageously, the scallop formations 20 present a tape 14 with an effective thickness $t_{14}$ (see FIG. 3) that is greater than that of a plain tape. The effective thickness $t_{14}$ is that measured so as to take into account the inward movement of the tape 14. That is, the effective thickness $t_{14}$ is a linear measurement that is measured from the substrate outside surface of the tape 14 to the innermost surface of the tape 14, as seen in FIG. 2. The scalloped edges 20 produce a pattern or profile having a 3-dimensional geometry that increases the rigidity of the strip 10. This reduces the opportunity for the strip 10 to corrugate, particularly as the distance $d_{12}$ between the nails 12 increases. In a present strip 10, in a tape 14 having a planar thickness of about 0.003 inches (3 mils), the scallop formation 20 is pressed or urged inward a distance of about 0.020 inches (20 mils).

The novel scalloped edges 20 in the tape 14 provide a number of advantages over known flat or planar tape strips. First, the scalloped edges 20 provide resistance to bending of the tape 14 per se, and, when forming part of the nail strip 10, help to reduce the tendency of the nail strip 10 to corrugate. In addition, the scallop formations 20 can provide points, as indicated at 26, at which the tape 14 will tend to shear, or frangible regions, to facilitate separation of the nail 12 as it is driven from the remainder of the strip 10. Thus, the scalloped edges 20 provide strength in the compressive direction (as indicated by the arrow at 28), to prevent corrugation and also to provide separation lines 26 along which the tape 14 can be torn.

As is depicted in FIG. 3, as the tape 14 is pressed around the shank of the nail 12, the adhesive 18 moves with the tape 14 and extends or flows around a portion of the nail 12. This tendency to extend around the nail 12 (or to partially envelope the nail 12) further enhances the resistance to corrugation by increasing the area over which the adhesive is present on the nail and the area over which the adhesive 18 adheres the tape 14 to the nail 12.

In a present strip 10, a ¾ inch wide tape 14 of 30 lb. kraft paper with thickness of about 0.003 inches (3 mils) was formed. The adhesive 18 was applied by coextrusion onto the substrate 14. The adhesive layer 18 was a heat reactive high density polyethylene based material applied to the substrate 14 to a thickness of about 9 to 11 mils. The scallops 20 were formed to a "depth" of about 20 mils.

In the illustrated strip 10, the nails 12 are positioned at an angle a of about 20 degrees to the transverse direction of the strip 10; however, other angles a are contemplated for use with the present invention. One of the advantages of the 20 degree collation system is that a greater number of nails 12 can be "packed" in less linear (tape measured) distance as the angle a decreases. As such, the number of nails 12 in a 20 degree collation is greater than the number of nails in a 30 degree collation system.

Figure 4:
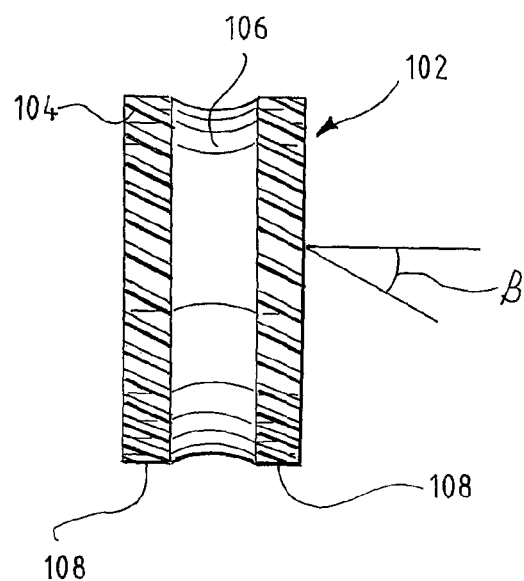
FIG. 4 is an edge view of an exemplary molding wheel used to form the scalloped edges.

Referring to FIG. 4, in order to form the scalloped edges 20, a molding wheel 102 is used (in use, molding wheels are located above the nails moving along a fabrication line and below the nails moving on the fabrication line to scallop the edge of the tape on both sides of the strip). The molding wheel 102 is formed with a discontinuous helical thread profile 104. The discontinuity is effected by an open central area 106 in the wheel 102. As will be appreciated from a study of the figures, the helical formation 104 is present at the edges 108 of the wheel 102 to press or for the scallops 20 in the upper and lower edges 22 (on both sides or tapes 14 of the strip 10), while the central area 106 is open or channeled so as to leave the middle section 30 of the tape 14 planar. In a present molding wheel 102, the threads 104 are formed at an angle $\beta$ that is about equal to the angle $\alpha$ at which the nail 12 is oriented relative to the tape 14.

One method for making the present strip 10 is to position the nails 12 in a conveyor or other indexing device, heat the nails 12, apply the tape 14 with the adhesive 18 on the tape 14 onto the heated nails 12 and introduce the nails 12 and the tape 14 to the molding wheel 102 to press the edges 22 of the tape 14 to form the scallops 20 while the adhesive 18 is still at an elevated temperature.

It will be appreciated that although the present strip 10 is described as formed from a plain paper strip 14, other materials, such as polyolefins can also be used or the strip. It will also be appreciated that a patterned strip can be used, such as a strip having an embossed pattern or the like and that all such material and structural modifications are within the scope and spirit of the present invention.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fastener assembly for use in a fastener driving tool, comprising:
    a row of fasteners, the fasteners each having a shank, the shanks arranged substantially parallel to each other, and defining a longitudinal plane through an axis of each of the fasteners; and
    a strip having a supporting substrate which is generally planar and parallel to the longitudinal plane, and an adhesive composition thereon, the supporting substrate having an elongated dimension extending generally in the direction of the row of fasteners, the supporting substrate having upper and lower edges, at least one of the edges having a non-overlapping scallop formation therein between the fasteners such that the scallop formation includes a curved, concave surface that extends inwardly from one or both of the upper and lower edges toward the longitudinal plane, from a plane of the strip, to stiffen the fastener assembly, the adhesive composition bonding to the shank of each of the fasteners to maintain the fasteners in the substantially parallel arrangement in the row, wherein strips are present on both sides of the row of fasteners to define opposing strips and wherein at least one of the upper and lower edges of the opposing strips have the scallop formation therein.

2. The fastener assembly in accordance with claim 1 wherein both the upper and lower edges have the scallop formation therein.

3. The fastener assembly in accordance with claim 1 wherein both the upper and lower edges of the opposing strips have the scallop formation therein.

4. The fastener assembly in accordance with claim 2 wherein a central portion of the strip, between the upper and lower edges is planar.

5. The fastener assembly in accordance with claim 1 wherein the substrate is laminated to the adhesive layer.

6. The fastener assembly in accordance with claim 5 wherein the adhesive layer is coextruded onto the substrate.

7. A method for making a fastener assembly comprising the steps of:

arranging a plurality of fasteners in a row parallel to one another;

heating the plurality of fasteners to elevate the temperature of the fasteners;

applying a strip having a substrate and an adhesive thereon to the heated fasteners along a side of the row, the strip having an upper edge and a lower edge;

applying pressure to the strip to adhere the strip to the fasteners;

forming a scallop formation in the strip at the upper or lower edge between the fasteners; and cooling the strip to form the fastener assembly.

8. The method in accordance with claim 7 including the step of arranging the fasteners parallel to one another and at an angle relative to an axis of a selected one of the fasteners.

9. The method in accordance with claim 8 wherein the angle is about 10 degrees to about 40 degrees.

10. The method in accordance with claim 9 wherein the angle is about 20 degrees to about 30 degrees.

11. The method in accordance with claim 7 including the step of forming scallop formations in the strip at the upper and lower edge between the fasteners.

12. The method in accordance with claim 7 including the step of introducing the fasteners with the strip applied thereto to a forming element having a discontinuous thread formation therein, the discontinuous portion corresponding to a region defining the scallop formation.

13. The method in accordance with claim 12 wherein the thread formation is a discontinuous helical thread formation having an open central region.

14. The method in accordance with claim 7 including the steps of applying a strip on both sides of the row of fasteners, and forming scallop formations in the strips at the upper and lower edge between the fasteners.

* * * * *